April 29, 1930.  J. R. STOWELL  1,756,399
SAW SHARPENING DEVICE
Filed June 13, 1928
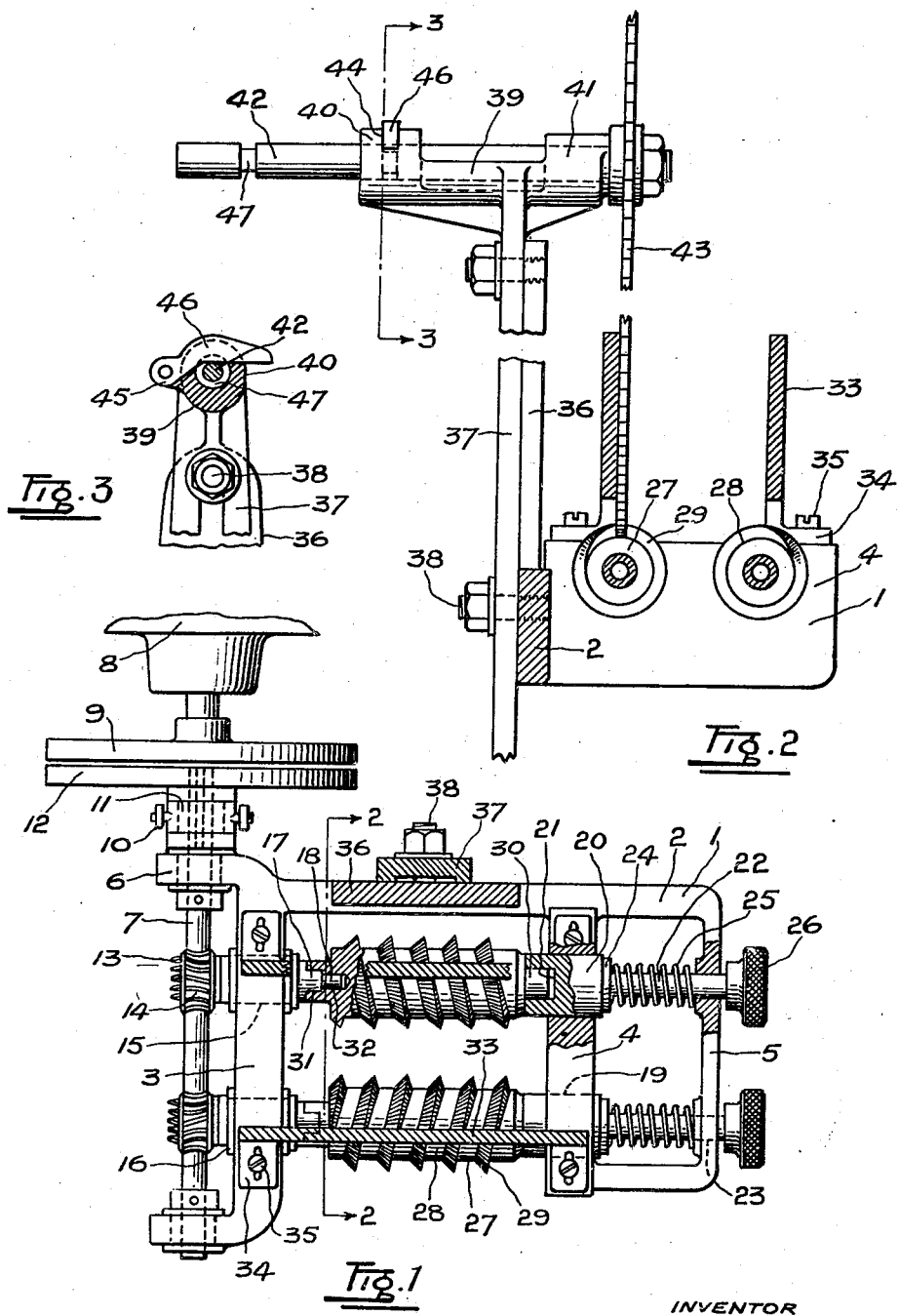
INVENTOR
JONATHAN ROBERT STOWELL
BY
Featherstonhaugh & Co
ATTORNEYS Patented Apr. 29, 1930

1,756,399

UNITED STATES PATENT OFFICE

JONATHAN ROBERT STOWELL, OF VANCOUVER, BRITISH COLUMBIA, CANADA

SAW-SHARPENING DEVICE

Application filed June 13, 1928. Serial No. 285,174.

My invention relates to improvements in saw sharpening devices the objects of which are to provide means whereby the teeth of a circular or straight saw may be brought by a continuous movement into engagement with a sharpening element whereby the rotation of the saw sharpening element moves the saws and sharpens them in a single operation, whereby the sharpening is effected in a uniform manner and with greatly increased speed over saw sharpening devices now in common use.

The invention consists essentially of a pair of helical saw sharpening elements of opposite pitch, which are adapted to cut two or more saw teeth simultaneously and are driven by any suitable motive power, as will be more fully described in the following specification and shown in the accompanying drawings in which:—

Fig. 1 is a plan view of the invention.

Fig. 2 is a sectional view taken on the line 2—2 of Figure 1.

Fig. 3 is a sectional view taken on the line 3—3 of Figure 2 showing the manner of holding the saw arbor against endwise movement.

In the drawings like characters of reference indicate corresponding parts in each figure.

The numeral 1 indicates generally a base frame having a longitudinal member 2 and transverse members 3, 4 and 5. Extending from one end of the base frame 1 is a pair of bearings 6 in which a shaft 7 is rotatably mounted. This shaft is adapted to be driven from a small motor 8 or other prime mover through a suitable clutch 9 which is actuated by a forked lever 10 engaging a trunnioned collar 11 on the endwise movable disc 12 of the clutch 9. The forked lever being preferably associated with a foot pedal (not shown) so that the operator can start or stop the machine at will. The shaft 7 is fitted with a pair of worms 13 of opposed pitch which engage a pair of worm wheels 14 fitted upon shafts 15 rotatably mounted in bearings 16 formed in the transverse member 3. The inner end of each of the shafts 15 is provided with a pair of dogs 17 and an axial projecting pin 18, the purpose of which will hereinafter appear.

Mounted in bearings 19 in the transverse member 4 are endwise movable shafts 20, the inner ends of which are provided with concentric recesses 21, while the outer ends of said shafts are reduced in diameter as at 22 and are journalled in bearings 23 in the transverse member 5. Each of shafts 20 is fitted with a thrust washer 24 and a compression spring 25 which abuts the inner face of the member 5 to thrust the shaft 20 towards the shaft 15 and a knurled knob 26 is fitted to the outer end of each shaft 20 so that it may be drawn endwise to withdraw the recess 21 into the bearing 19.

The numeral 27 indicates generally a pair of sharpening elements, which consist of shafts 28 upon the periphery of which helical threads 29 of opposing pitch are formed, which threads are cut in a similar manner to a saw file and serve a similar purpose. The threads 29 are of a cross section corresponding to the space between the teeth of a saw and are so spaced as to fit each alternate tooth thereof.

The shafts 28 of the cutting elements are provided at one end with stubs 30 which are adapted to fit the recess 21 in the shafts 20 and also transverse slots 31 and recesses 32 at the other end which are adapted to engage the dogs 17 and the pins 18 of the shafts 15, so that the drive of said shafts 15 is communicated to the cutting elements 27. The cutting elements are interchangeable and are of such pitch and have such size of thread as to conform to the different saws that it is desired to sharpen. Adjustably fitted upon the base frame 1 are vertical guide plates 33 having slotted feet 34 which rest upon the transverse members 3 and 4 and are secured thereto by screws 35. A standard 36 extends vertically from the longitudinal member 2 upon which a slotted upright 37 is adjustably fitted and is clamped thereto by bolts 38. The upright 37 is provided with a T-head 39 having at its extremities bearings 40 and 41 in which an arbor 42 is mounted for the purpose of carrying a circular saw 43 to be sharpened. The bearing 40 is provided with a transverse slot 44 and a hinge lug 45 in which latter a swing arm 46 is normally adapted to rest. The saw arbor 42 is provided with a pair of annular grooves 47 which are spaced apart a substantially similar distance to the spacing between the vertical guides 33 and which serve to receive the swing arm to hold the arbor against endwise movement with the saw 43 in engagement with one or other of the guides. To sharpen a circular saw, the upright 37 is adjusted so as to dispose the arbor 42 at a proper height for sharpening, and the saw 43 is fitted thereon.

The arbor is then moved endwise until the saw engages one of the vertical guides 33 and the swing arm 46 is dropped into position within the desired groove 47. The clutch 9 is then thrown into engaging position by the forked lever 10, setting the machine in motion and imparting rotation to the sharpening elements 27, the threads of which engage the teeth of the saw transversely in a similar manner to that employed in hand filing; the helical disposition of these threads in rotation slowly rotates the saw, thus engaging and sharpening each alternate saw tooth in succession. When one set of teeth have been sharpened, the swing arm 46 is raised and the saw arbor 42 moved endwise, so that the saw moves out of contact with one vertical guide 33 and into contact with the other and over the second sharpening element, which is then rotated to sharpen the remaining teeth of the saw. With saws having straight cutting edges, such as cross cut, and hand saws generally, the saw is first moved endwise along one sharpening element and then along another, sharpening alternate teeth of the saw first on one side of the saw and then on the other.

It will be obvious that as several threads of the sharpening elements are cutting simultaneously along the saw, the work when completed will be both straight and uniform, so that the results obtained will be far superior to that attained by hand filing and the speed of sharpening by my device would be infinitely more rapid than is possible by hand work.

What I claim as my invention is:

1. A saw sharpening device comprising a frame, a pair of helically threaded cutting elements rotatably mounted in the frame, a horizontal bearing carried by the frame in elevated relation thereto, a horizontal saw arbor longitudinally slidable in said bearing and coacting means carried by the arbor and bearing for securing the arbor in different positions of adjustment.

2. A saw sharpening device as recited in claim 1 in which the means for securing the arbor in adjusted position comprises a latch carried by the bearing and selectively engageable in one of several grooves formed in the arbor.

3. A device of the character described comprising a horizontal frame, saw sharpening means journalled in said frame, a horizontally disposed bearing carried by the frame in elevated relation thereto, an adjustable connection between the bearing and the frame serving to permit raising and lowering of the bearing with respect to said frame, a saw arbor slidably and rotatably mounted in said bearing, said arbor being longitudinally movable in the bearing to different positions of adjustment and means for securing said arbor in adjusted positions.

4. A saw sharpening machine comprising a frame, a rotary sharpening element, a shaft journalled in the frame and having one end in interfitting engagement with a corresponding end of the rotary sharpening element whereby the latter is caused to move with said shaft when the latter is rotated, a cylindrical projection carried by the remaining end of the rotary sharpening element, a second shaft slidably and rotatably mounted in the frame and provided with a cylindrical recess receiving said projection and a spring confined between a portion of said shaft and a portion of the frame serving to press the shaft in the direction of the sharpening element.

Dated at Vancouver, B. C., this 1st day of June, 1928.

JONATHAN ROBERT STOWELL.